C. A. DIES.
PIPE FITTING.
APPLICATION FILED OCT. 20, 1914.

1,182,360.

Patented May 9, 1916.

UNITED STATES PATENT OFFICE.

CHARLES ALBERT DIES, OF CHICAGO, ILLINOIS, ASSIGNOR TO CLAYTON MARK AND ANSON MARK, DOING BUSINESS UNDER THE NAME OF THE MARK MANUFACTURING COMPANY, OF CHICAGO, ILLINOIS.

PIPE-FITTING.

1,182,360. Specification of Letters Patent. Patented May 9, 1916.

Application filed October 20, 1914. Serial No. 867,654.

*To all whom it may concern:*

Be it known that I, CHARLES A. DIES, a citizen of the United States, and a resident of the city of Chicago, in the county of Cook and State of Illinois, have invented new and useful Improvements in Pipe-Fittings, of which the following is a specification, reference being had to the accompanying drawings, in which—

Figure 1:
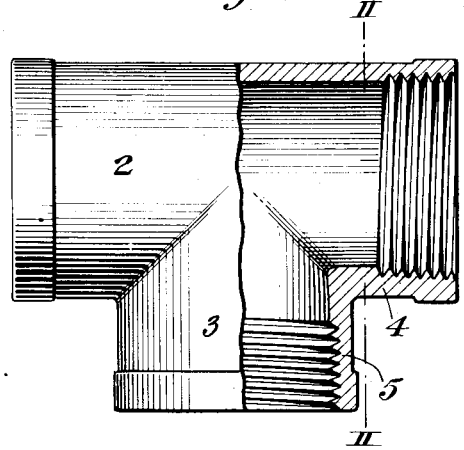
Figure 2:
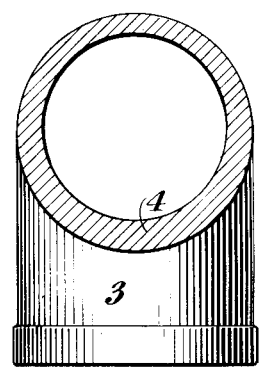

Figure 1 is an elevation, partly in section, of a pipe fitting embodying my invention, in the form of a T; Fig. 2 is a section on lines II—II of Fig. 1, and Fig. 3 is an elevation, partly in section, showing a further embodiment of my invention in the form of a cross.

My invention relates to pipe fittings, and consists in a cold worked steel fitting made from seamless tubing, or from flat steel drawn into seamless tubing of the desired length, in which the metal has been densified and in which the juncture between the projection or projections and the walls of the tube has been densified and thickened by the working of the metal, so that the fitting has been greatly strengthened at the points which are usually points of weakness. Fittings constructed in accordance with my invention are of greater strength and require less stock than fittings heretofore employed.

Referring to the drawings, in Figs. 1 and 2 of which I have shown a fitting in the form of a T, the fitting is comprised of a longitudinal portion 2 and a projection 3. The longitudinal portion 2 has walls 4, which have been thickened adjacent and connected to the walls 5 of the projections. The thickening of the walls 4 forms a reinforcement at the right-angled connection between the walls of the longitudinal portion 2 and the walls 5 of the projections. Instead of drawing the metal outwardly to form the projection 3 the metal along the wall 4 is caused to flow by longitudinally and radially applied compression toward the projection which results in thickening and densifying the metal at the desired points, and the whole body of the fitting is also strengthened and rendered more uniform by the working and densification of the metal.

Figure 3:
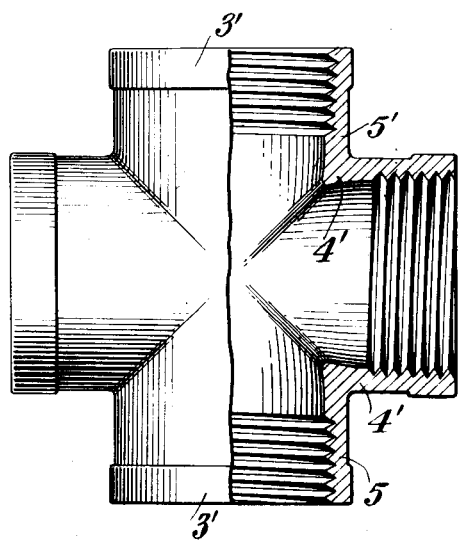

In Fig. 3 I have shown a fitting in the form of a cross in which the walls 4' of the fitting have been thickened and act as reinforcements for the walls 5' of the projections 3'.

Fittings constructed in accordance with my invention are preferably made in the manner described in my co-pending application, Serial No. 520,256, filed September 30, 1909, for process of making pipe fittings. I have found that the improved pipe coupling described herein has very great strength in comparison with its weight, is extremely durable and adapted for extremely high pressures, due to the fact that it is worked from seamless tubing or plate metal, is of uniform character, is densified in process of manufacture and is reinforced by thickening its walls at the points which are usually points of greatest weakness.

It is obvious that various modifications may be made in the fittings which I have described and shown herein without departing from my invention.

What I claim is:

1. As a new article of manufacture, a cold worked steel pipe fitting having a longitudinally-extending portion and a projection at right angles to the axis of the longitudinally-extending portion, the metal forming the juncture between a wall of the longitudinally-extending portion and a wall of the projection being thickened as a reinforcement therefor.

2. As a new article of manufacture, a cold worked steel pipe fitting formed by longitudinally applied compression, consisting of a longitudinally-extending portion and a projection at right angles thereto, the said fitting having thickened and reinforced walls at the juncture between a side of the longitudinally-extending portion and a side of the projection.

3. As a new article of manufacture, a cold worked steel pipe fitting formed by longitudinally-applied compression, consisting of a longitudinally-extending portion and a projection at right angles thereto, the said fitting having walls of densified metal and being thickened and reinforced at the juncture between a side of the longitudinally-extending portion and the adjacent side wall of the projection.

CHARLES ALBERT DIES.

Witnesses:
  E. M. KIDDER,
  E. A. BRUEGEL.